(12) United States Patent
Sheets

(10) Patent No.: US 8,941,504 B2
(45) Date of Patent: Jan. 27, 2015

(54) OIL LEVEL MEASUREMENT SYSTEM AND METHOD

(76) Inventor: Avery T. Sheets, Indianapolis, IN (US)

( * ) Notice: Subject to any disclaimer, the term of this patent is extended or adjusted under 35 U.S.C. 154(b) by 239 days.

(21) Appl. No.: 13/557,318

(22) Filed: Jul. 25, 2012

(65) Prior Publication Data

US 2013/0027210 A1 Jan. 31, 2013

Related U.S. Application Data

(60) Provisional application No. 61/512,951, filed on Jul. 29, 2011.

(51) Int. Cl.
*G08B 21/00* (2006.01)
*B60Q 1/00* (2006.01)
(Continued)

(52) U.S. Cl.
CPC ............ *F16H 57/0447* (2013.01); *F16H 59/72* (2013.01)
USPC ........ 340/618; 340/450.2; 340/605; 340/612; 701/104; 701/123; 702/50; 702/55; 73/53.04; 73/61.56

(58) Field of Classification Search
CPC . F16H 57/0447; F16H 59/72; F16H 57/0405; F16H 57/0449; F16H 59/48; G01F 23/0061; G01F 23/04; G01F 23/0076; G01F 23/266; G01F 23/268; G01F 9/008; G01F 23/247; G01F 23/14; G01F 23/185; G01F 23/62; G01F 23/74; G01F 23/003; G01F 23/282; G01F 23/36; G01F 23/64; G01F 23/68; G01F 23/70; G01F 23/76; B60K 15/03006; B60K 2015/03217; F01M 11/0458; F01M 11/06; F01M 11/10; F01M 2011/0466; F01M 2011/0475; F16N 2230/02; G01K 13/02; G01N 33/1886; H01H 29/20; H01H 35/18; H01H 35/186

USPC ............. 340/618, 605, 450.2, 603, 623, 624, 340/425.5, 439, 449, 450; 701/65, 29, 101, 701/30, 35, 34; 702/55, 50; 73/40, 49.2, 73/292, 295, 305
See application file for complete search history.

(56) References Cited

U.S. PATENT DOCUMENTS 6,577,959 B1 * 6/2003 Chajec et al. ................... 702/50
6,625,526 B2 9/2003 Gras
(Continued)

FOREIGN PATENT DOCUMENTS

JP 09-217821 A 8/1997
JP 2011-007065 A 1/2011

OTHER PUBLICATIONS

Notification of Transmittal of the International Search Report and the Written Opinion of the International Searching Authority, or the Declaratoin along with the Written Opinion of the International Searching Authority; Mail date: Jan. 7, 2013; pp. 1-13.

*Primary Examiner* — Jennifer Mehmood
*Assistant Examiner* — Mirza Alam
(74) *Attorney, Agent, or Firm* — Taft Stettinius & Hollister, LLP; Stephen F. Rost, Esq.

(57) ABSTRACT

The present invention provides a method of determining if a fluid level in a transmission is satisfactory. The transmission includes a controller and is coupled to a powered vehicle. The method includes measuring a grade of the surface upon which the vehicle is positioned with an inclinometer and measuring the fluid level in the transmission with a fluid sensor. The method also includes communicating the measured grade and measured fluid level to the controller and determining a fluid level threshold based on the measured grade. The measured fluid level and fluid level threshold are compared and a determination is made if the measured fluid level is satisfactory based on the comparison.

19 Claims, 5 Drawing Sheets

(51) Int. Cl.
*B60T 7/12* (2006.01)
*G06F 19/00* (2011.01)
*G01F 17/00* (2006.01)
*G01F 23/00* (2006.01)
*G01N 11/00* (2006.01)
*G01N 1/00* (2006.01)
*F16H 57/04* (2010.01)
*F16H 59/72* (2006.01)

(56) References Cited

U.S. PATENT DOCUMENTS

| | | | |
|---|---|---|---|
| 2002/0194910 A1* | 12/2002 | Schelhas et al. | 73/290 R |
| 2009/0182467 A1* | 7/2009 | Nedorezov | 701/30 |
| 2010/0238013 A1* | 9/2010 | Grothaus et al. | 340/450.2 |
| 2011/0270542 A1* | 11/2011 | Chappell et al. | 702/55 |

* cited by examiner

OIL LEVEL MEASUREMENT SYSTEM AND METHOD

RELATED APPLICATIONS

This application claims priority to U.S. Provisional Patent Application Ser. No. 61/512,951, filed Jul. 29, 2011, which is hereby incorporated by reference in its entirety.

BACKGROUND

The present invention relates to a system and method for measuring an oil level, and in particular to a system and method of measuring an oil level of a transmission in a powered vehicle while compensating for the grade upon which the vehicle is disposed.

Conventional oil level measurement systems in a vehicle include a tube that is placed in an engine or transmission and a dipstick with measurement markings indicating the oil level. As the dipstick is placed inside the tube, the level of oil present in the engine or transmission can be determined by checking the location on the dipstick where the fluid is present.

In a powered vehicle, it is desirable to check the oil level of the engine and transmission to ensure enough oil is present therein. Low quantities of oil can cause damage to the engine or transmission due to overheating, for example. Conventional oil level sensors are able to detect the present oil level and provide a reading to a vehicle operator. If the oil level is too low, the operator can add oil until the oil level is satisfactory. Unfortunately, these conventional systems are only able to provide accurate results when the vehicle is on a level surface. Thus, before an accurate oil level can be measured, the vehicle must be moved to a level surface. Depending on the surrounding terrain, this can be difficult to achieve. Further, if the oil level is low, a slight grade might hide the true oil level causing a vehicle to be driven in spite of the oil level.

Therefore, a need exists for providing an oil level measurement system that can accurately measure an oil level regardless of the grade at which a vehicle is positioned.

BRIEF DESCRIPTION OF THE DRAWINGS

The above-mentioned aspects of the present invention and the manner of obtaining them will become more apparent and the invention itself will be better understood by reference to the following description of the embodiments of the invention, taken in conjunction with the accompanying drawings, wherein.

Corresponding reference numerals are used to indicate corresponding parts throughout the several views.

DETAILED DESCRIPTION

The embodiments of the present invention described below are not intended to be exhaustive or to limit the invention to the precise forms disclosed in the following detailed description. Rather, the embodiments are chosen and described so that others skilled in the art may appreciate and understand the principles and practices of the present invention.

The present invention relates to an oil level measurement system in an engine or transmission. However, the oil level measurement system can be applied to any apparatus or housing that holds a fluid. The fluid can be oil, gasoline, water, etc.

Figure 1:
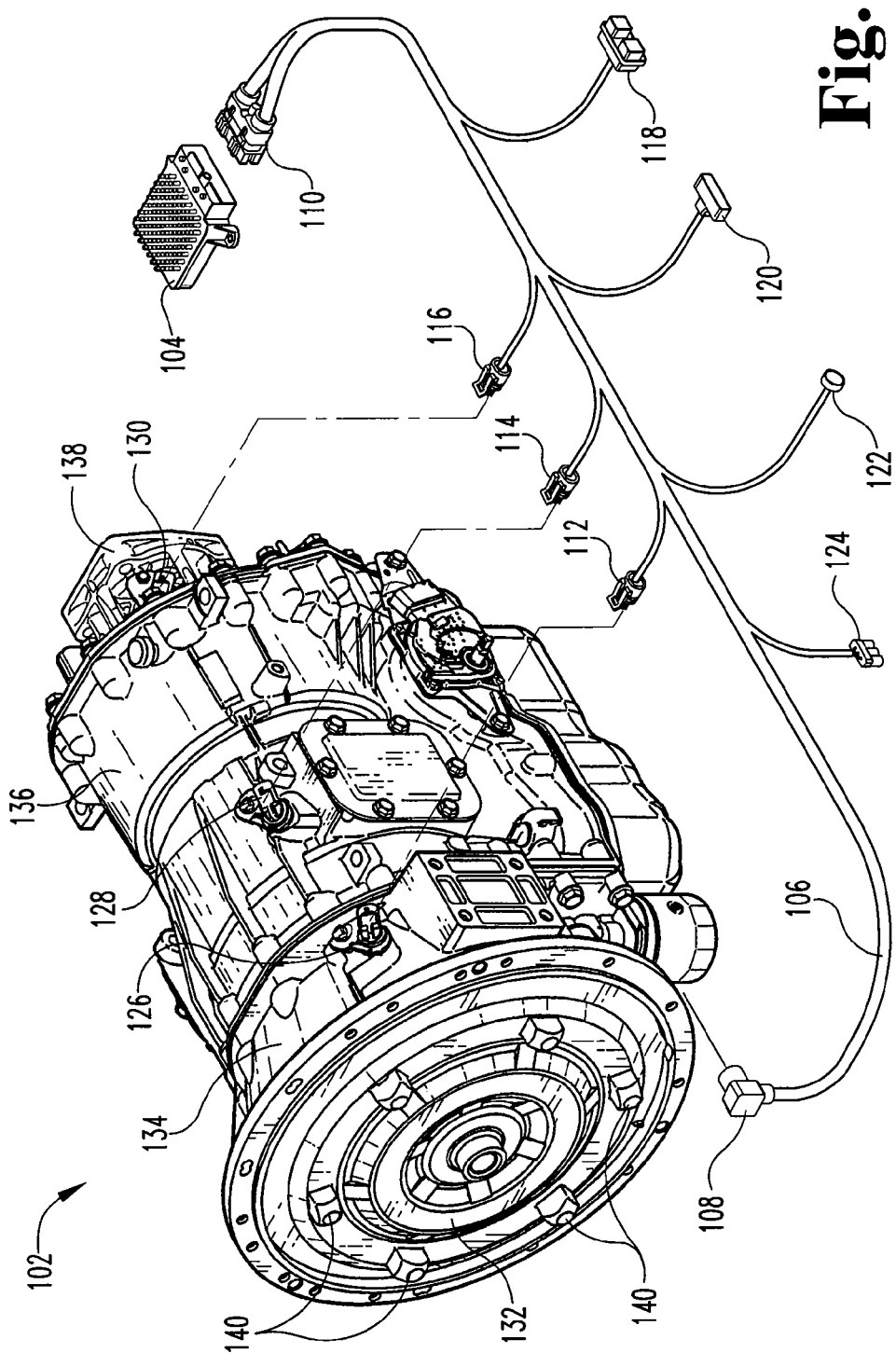
FIG. 1 is a perspective view of one embodiment of a transmission coupled to a controller via a wiring harness.

With reference to FIG. 1, an exemplary embodiment of a transmission setup is provided. A transmission 102 is shown in FIG. 1 with a controller 104, i.e., transmission control module ("TCM"). Software is downloaded to the TCM 104 and a wiring harness 106 couples the TCM 104 to the transmission 102. A conventional wiring harness 106 includes an outer plastic body that surrounds wires that extend from a TCM connector 110 at one end of the wiring harness 106 to a transmission connector 108 disposed at the opposite end of the wiring harness 106.

The wiring harness 106 can also include other connectors such as speed sensor connectors. In FIG. 1, for example, an engine or input speed sensor connector 112 couples to an engine or input speed sensor 126 of the transmission 102. Likewise, in an embodiment in which a torque converter is present, a turbine speed sensor connector 114 couples the wiring harness 106 to a turbine speed sensor 128 of the transmission 102. Also, an output speed sensor connector 116 of the wiring harness 106 couples to an output speed sensor 130 of the transmission 102. Other possible connectors of the wiring harness 106 include a data bus connector 120, a throttle position sensor (TPS) 124, a vehicle connector 118 (e.g., Vehicle Interface Module ("VIM") connector), and an alternative transmission harness mating connector 122. There can be additional connectors and/or harnesses in other embodiments.

As noted, the transmission 102 can include the engine or input speed sensor 126, turbine speed sensor 128, and output speed sensor 130. In this embodiment, the transmission 102 mounts to an engine (not shown) by coupling a converter housing 134 of the transmission 102 to a flywheel housing (not shown) of the engine (not shown). A torque-transferring mechanism 132, e.g., a torque converter or fluid coupling, of the transmission 102 can include a plurality of lugs 140 that couple to a flex plate (not shown) via flex plate bolts (not shown). For purposes of this embodiment, the torque-transferring mechanism 132 will be referred to as a torque converter. In some embodiments, a torque converter may not be present. In these embodiments, an input shaft of the transmission 102 is coupled to the engine via a clutch, for example.

In one embodiment, an internal combustion engine (not shown) can be coupled to the transmission 102 via the torque converter 132 (or input shaft for those embodiments without a torque converter). The internal combustion engine can be configured to rotatably drive an output shaft (not shown) of the engine that is coupled to the input (not shown) of the torque converter 132. The torque converter 132 can further include a turbine (not shown) that is coupled via splines to a turbine shaft (not shown) of the transmission 102. In turn, the turbine shaft (not shown) can be coupled to, or integral with, a rotatable input shaft (not shown) of the transmission 102. An output shaft (not shown) of the transmission 102 can be coupled to or integral with, and rotatably drives, a propeller shaft (not shown) that is coupled to a conventional universal joint (not shown). The universal joint (not shown) can be coupled to, and rotatably drives, a drive axle (not shown) having tires or wheels mounted thereto at each end. The output shaft (not shown) of the transmission 102 drives the tires in a conventional manner via the propeller shaft, universal joint and drive axle.

During operation, as the engine rotatably drives the torque converter 132, the engine or input speed sensor 126 detects the rotational speed of the torque converter 132. The torque converter 132 can include ribs or protrusions (not shown) that protrude from the surface of the torque converter 132 and which the engine or input speed sensor 126 measures during each revolution.

As shown in FIG. 1, the transmission 102 can also include a main case or housing 136 that encloses a gearbox, i.e., gears, dog clutches, clutch plates and reaction plates, a number of automatically selectable gears, planetary gear sets, hubs, pistons, shafts, and other housings. The transmission 102 can further include a turbine shaft (not shown) which can rotate various clutches or shafts in the transmission. A gear or tonewheel (not shown) can be coupled to the turbine shaft (not shown) such that the turbine speed sensor 128, which couples to the main case or housing 136, measures the rotational speed of the gear or tonewheel (not shown). Other transmissions can include alternative ways known to the skilled artisan for measuring turbine speed.

In one embodiment, the transmission 102 can include an output shaft (not shown) which is enclosed by a rear cover 138 of the transmission 102. To measure the output speed of the transmission 102, the output speed sensor 130 can couple to the rear cover 138. A smaller gear or tonewheel (not shown) can be coupled to the output shaft (not shown) such that the output shaft and gear or tonewheel rotate together. The output speed sensor 130 is aligned with the gear or tonewheel and measures the rotational speed of the output shaft.

Transmission shift schedules and other related instructions are included in software which is downloaded to the TCM 104. The TCM 104 can control the shifting of the transmission by electrically transferring instructions to the transmission such that certain actions are carried out by the clutches, dog clutches, pistons, etc. In one non-limiting embodiment, the TCM 104 is part of a transmission control circuit that can further include an electronic solenoid and valve assembly for controlling the engaging and disengaging of clutch assemblies, etc. Components within the transmission 102 can be activated electrically, mechanically, pneumatically, automatically, semi-automatically, and/or manually. The transmission control circuit is able to control the operation of the transmission to achieve desired performance.

Based on instructions in a transmission software program, the transmission control circuit (e.g., TCM 104) can select a shift schedule depending on a vehicle's driving condition and execute instructions contained in the software by sending signals through the wiring harness 106 to control the transmission 102. The TCM 104 can also receive measurement data from the transmission 102 such as, for example, input speed from the input speed sensor 126, turbine speed from the turbine speed sensor 128, and output speed from the output speed sensor 130. In an embodiment in which the transmission does not include a torque converter 132, the transmission may only have an input speed sensor 126 and output speed sensor 130. The TCM 104 can also calculate various parameters including transmission gear ratio or range, which is typically the ratio of input speed to output speed. In an embodiment in which the transmission 102 has a torque converter 132, the transmission gear ratio or range can also be determined by the ratio of turbine speed to output speed.

The TCM 104 can also receive accelerator pedal position (i.e., throttle percentage) from a throttle input source, which can be coupled to an engine control module (ECM) or vehicle control module (VCM) for transmitting throttle data over a data bus. Examples of a conventional data bus include J1587 data bus, J1939 data bus, IESCAN data bus, GMLAN, Mercedes PT-CAN. In addition, a Hardwire TPS (throttle position sensor) to TCM or Hardwire PWM (pulse width modulation) to TCM can be used. Information such as accelerator pedal position that is communicated over the data bus is not limited to a particular engine/transmission configuration. Instead, the data bus can be adapted to most vehicle setups.

In an exemplary embodiment, the TCM 104 can include an inclinometer electrically coupled therein. The inclinometer can be self-calibrating and thus can learn its orientation relative to gravity at all times. This can enable the TCM 104 to be mounted in different places, including inside the transmission 100, and at different angles. Since the transmission 100 can be installed at different installation angles, the inclinometer learns or "re-zeroes" itself for each measurement. In some instances, the inclinometer may have to be calibrated a first time on level ground, but in other cases the factory settings of the inclinometer may be sufficient. An example of an inclinometer is the SCA3100-D04 inclinometer manufactured by VTI Technologies.

Figure 5:
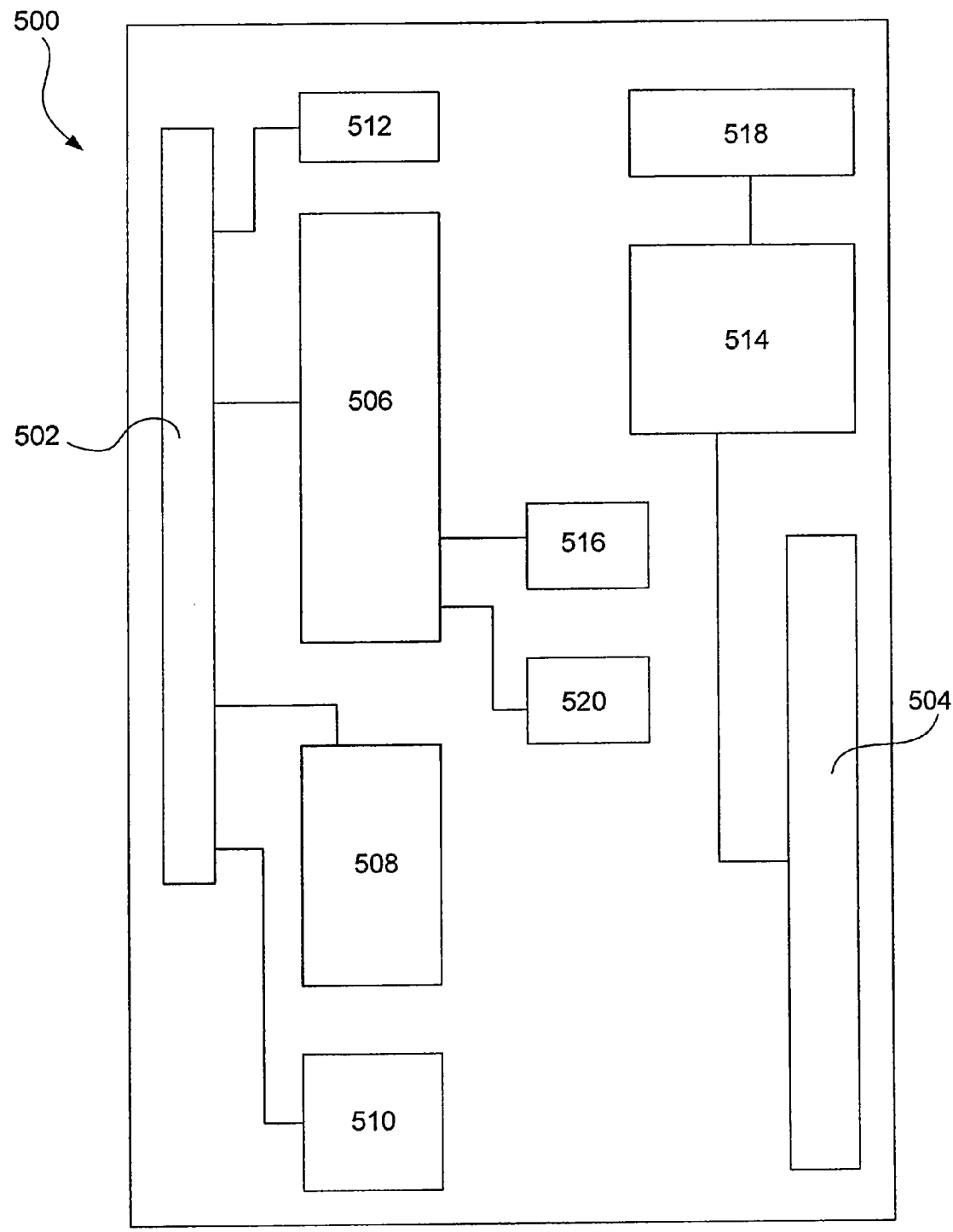
FIG. 5 is a diagram of an exemplary controller.

Referring to the embodiment of FIG. 5, the TCM 104 defines a control system 500 that can include an electrical portion, a mechanical portion, a hydraulic portion, and/or a pneumatic portion. For instance, the control system 500 can hydraulically control valves and the like while electrically controlling solenoids. As shown, the control system 500 includes an input side 502 and an output side 504. The input side 502 can include a digital interface 506, an analog interface 508, and a speed interface 510. Thus, the control system 500 can receive signals from other electronic devices and also transmit electrical signals. In a vehicle, for example, a throttle sensor (not shown) can transmit a throttle position to the control system 500 such that the throttle position signal is received at the input side 502 of the control system 500. Similarly, the control system 500 can transmit a signal to another controller (e.g., engine controller) via the output side 504 thereof The control system 500 can also include a power supply 512 which can electrically coupled to a vehicle power supply (e.g., battery or ignition). The control system 500 can further include measurement devices such as a speedometer 514, inclinometer 516, diagnostic tools 518, and a timer 520. Each of these devices can measure different characteristics of a vehicle, engine, transmission, or other device. These measured characteristics can be considered by the control system 500 for performing different tasks. The inclinometer 516 can also be an accelerometer in some embodiments.

Figure 2:
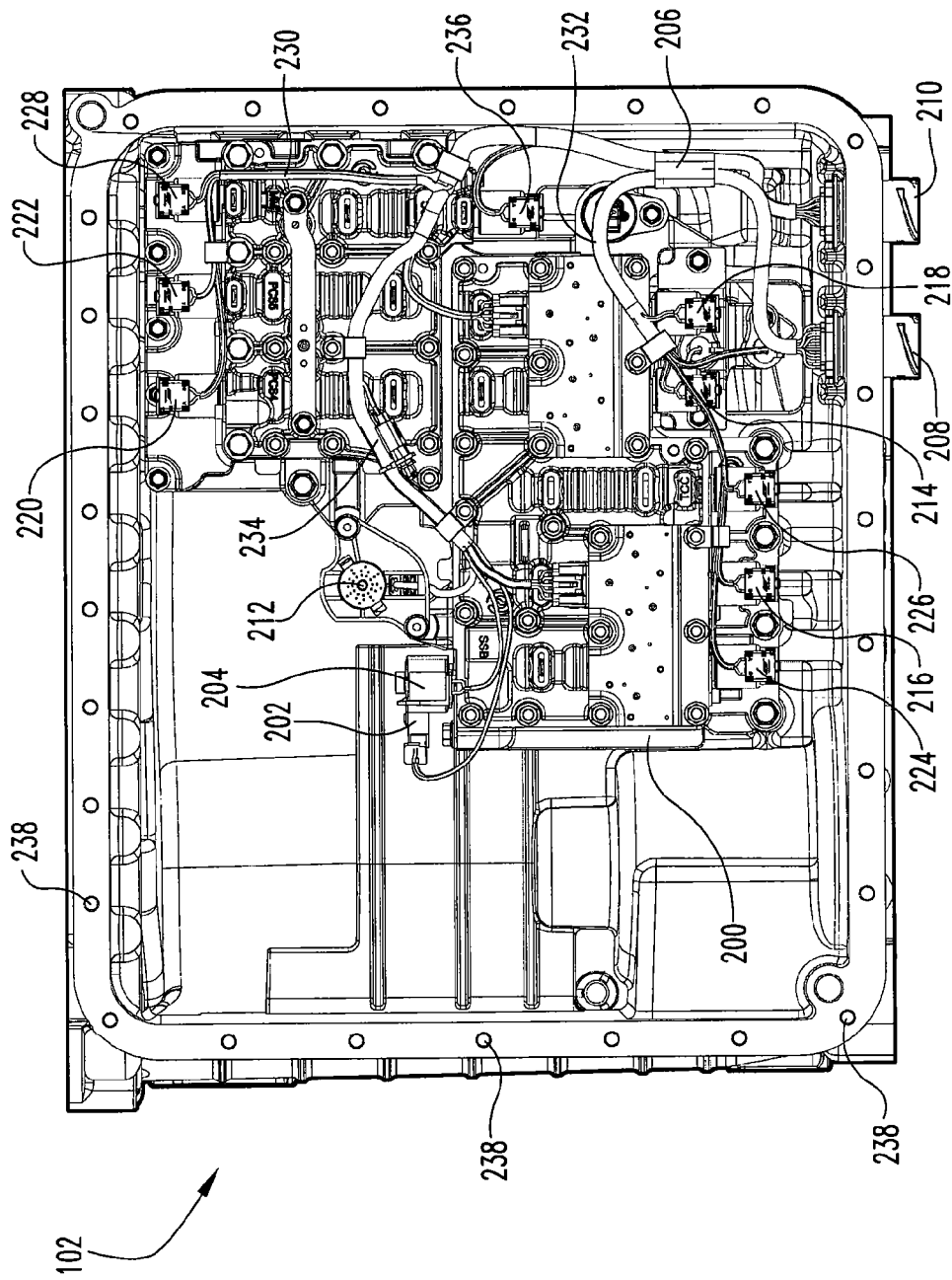
FIG. 2 is a bottom view of a transmission and control assembly.

Referring to FIG. 2, an embodiment of a transmission 102 is shown. In this embodiment, a valve body or housing 200 is provided and can include a plurality of solenoids, valves, switches, sensors, and other controllable devices. These solenoids, valves, switches, sensors, etc. can control clutch pressures, valve movement, pressures, temperatures, sensors, and the like. In FIG. 2, the housing 200 can include a first main solenoid 202 and a second main solenoid 204. These solenoids are coupled via a wiring harness 206 to a first connector 208 and a second connector 210. The first connector 208 and second connector 210 can be further coupled to a transmission wiring harness 106. In this embodiment, the TCM 104 can send signals to the valve body 200 of FIG. 2 via the first connector 208 and second connector 210 for controlling the solenoids, valves, sensors, etc.

The valve body 200 can include a plurality of solenoids which are identified in FIGS. 2 as 214, 216, 218, 220, 222, 224, 226, 228, and 236. Each of these solenoids can control transmission shifting, pressure modulation, and clutch performance of different transmission components. As shown, the wiring harness 206 can include a first portion 230, a second portion 232, and a third portion 234 for coupling to the plurality of solenoids. In other embodiments, there can be additional harnesses for coupling to different solenoids, switches, sensors, valves, etc.

An oil level sensor 212 is also shown in FIG. 2. An example of an oil sensor is the AccuStar Fluid Level Sensor manufactured by Measurement Specialties, Inc. A pan (not shown) can be coupled to the transmission 102 with fasteners to a plurality of threaded openings 238 for substantially enclosing the valve body 200. As shown, the oil level sensor 212 is positioned near the center of the pan. The sensor 212 can detect the amount of fluid in the pan and send a signal to the control system 500 of the TCM 104. The signal can be a voltage, for example, which the control system 500 computes to a dimension such as length, volume, etc. For instance, a signal can be received by the control system 500 via its input side 502 and the signal interpreted such that the oil level in the transmission is either satisfactory, too low, or too high. The level of oil in the transmission can be transmitted to a display (not shown) such as a vehicle dashboard, shift selector, etc. In some instances, the oil level signal can either be a number or instruction from the control system 500. For example, if the oil level is two quarts low, the control system 500 may transmit an instruction which is displayed to a vehicle operator indicating that two quarts of oil needs to be added to the transmission before operating the vehicle. Alternatively, the control system 500 may communicate that the oil level is 100 mm and a chart or the like in an instruction manual, for example, may indicate that this is a satisfactory oil level for operating the transmission.

Figure 3:
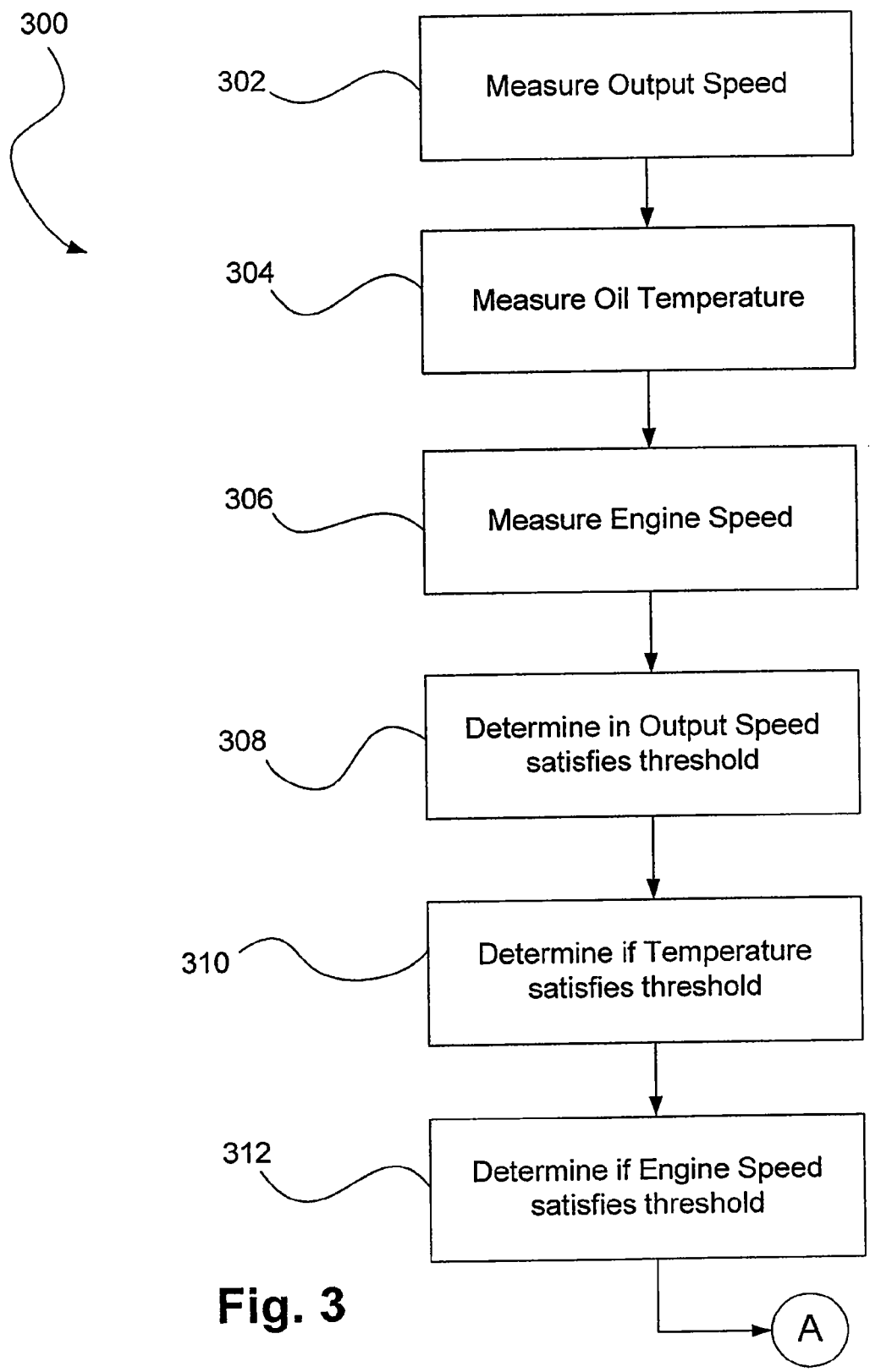
FIG. 3 is a flowchart of an embodiment for determining a transmission oil level.
Figure 4:
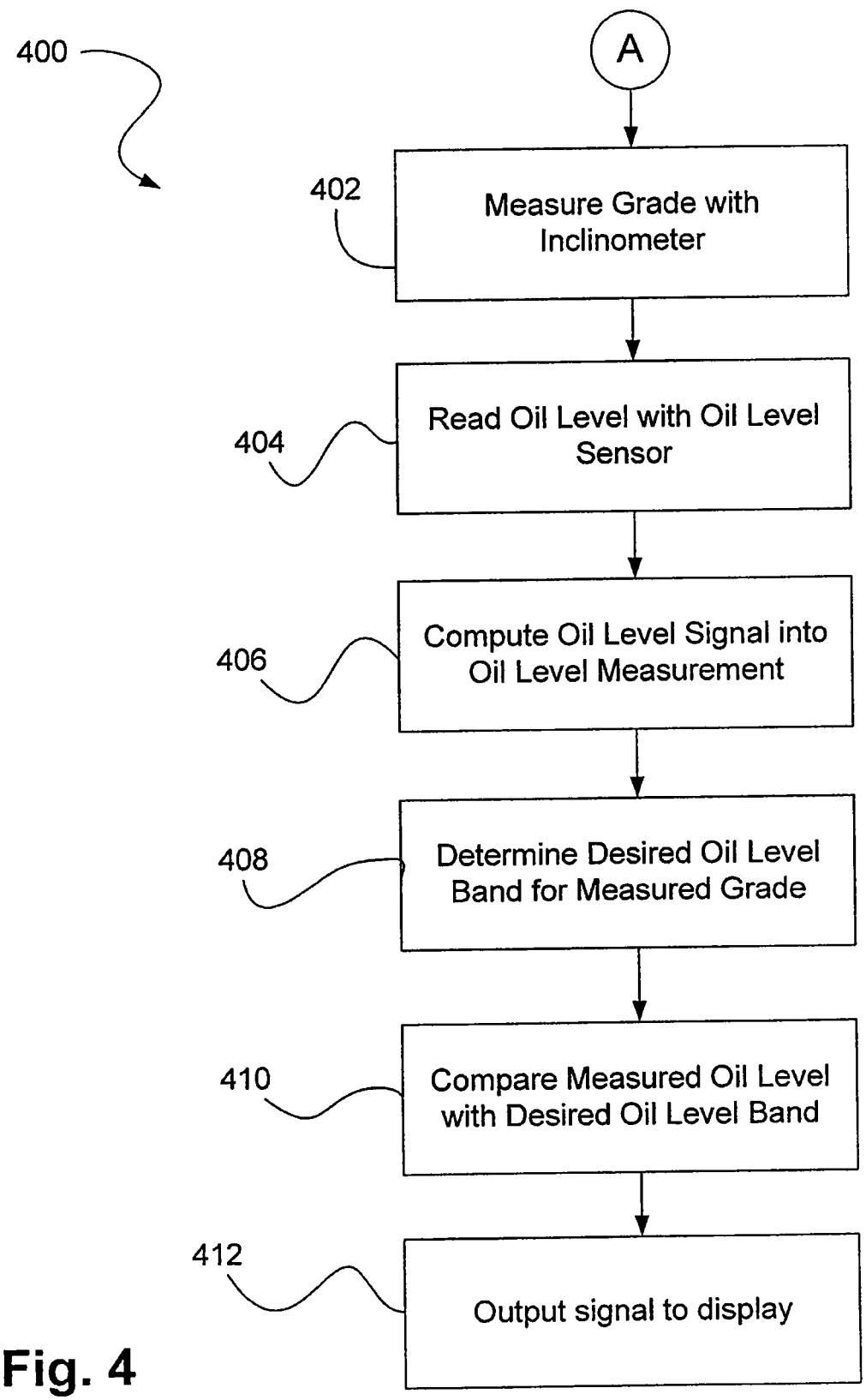
FIG. 4 is a second flowchart of the embodiment of FIG. 3 for determining a transmission oil level.

As described above, conventional oil level systems are unable to adequately measure oil level on uneven or graded surfaces. Referring to FIG. 3, however, a method for determining an oil level regardless of grade is provided. This method is tailored for a powered vehicle having an automatic transmission, but may be useful for other applications such as manual or automated manual transmissions.

The method can include a first part 300 and a second part 400. The first part 300 can be referred to as an enabling algorithm such that unless the conditions set forth in the first part 300 are met, the method cannot perform the steps in the second part 400. The second part 400 can be a performance algorithm. In the first part 300, a plurality of measurements or determinations are made. First, in block 302, the transmission output speed is measured by an output speed sensor 130. In block 304, the oil temperature of the transmission is measured by a temperature gage, thermocouple, temperature sensor, etc. Although not shown, the temperature sensor is electrically coupled to the TCM 104 for communicating the oil temperature thereto. In block 306, the engine or input speed is measured by an input speed sensor 126. The transmission input and output speeds are communicated to the TCM 104.

As part of the enabling algorithm, blocks 308, 310, and 312 set forth conditions that are tested by the TCM 104 for determining whether to enable the oil level sensing method. In block 308, the measured transmission output speed is compared to a first threshold such that the output speed cannot exceed a certain RPM. This first threshold, for example, can be 50 RPM. The first threshold, referred to as an output speed threshold, can be desirably set so that the transmission output speed is as close to 0 RPM before the condition set forth in block 308 is satisfied.

In block 310, the measured oil temperature is compared to a second threshold, referred to as an oil temperature threshold. The oil temperature threshold can be set such that the transmission oil temperature is either above, below, or above and below user-defined temperatures before the condition set forth in block 310 is satisfied. As a non-limiting example, the measured oil temperature may need to be above 30-40° C.

In block 312, the measured input speed is compared to a third threshold, referred to as an input speed threshold. The input speed threshold can be set at any input speed. In one non-limiting example, the input speed threshold can be set at 1000 RPM or below. In another such example, the input speed threshold can be set at 700 RPM. Regardless of the set value, the TCM 104 can determine whether the measured input speed satisfies the condition set forth in block 312 for enabling the oil level sensing method.

The first, second, and third thresholds can be downloaded into the TCM 104 through a software or calibration program before the transmission can be operated. So long as the conditions set forth in blocks 308, 310, and 312 are met, the first part 300 of the oil level sensing method is completed. In the event one or more of these conditions are not met, the TCM 104 can repeat each of blocks 302, 304, 306, 308, 310, and 312 until the conditions are met. In addition, other embodiments may require fewer or additional conditions for enabling the oil level sensing method.

Once the conditions set forth in the first part 300 of the oil level sensing method is or are met, the second part 400 of the method can be performed. In block 402, the inclinometer 516 disposed in the controller 500 can measure the grade upon which the vehicle is positioned. In one embodiment, the inclinometer 516 can re-calibrate before measuring the grade. Once the grade is measured, the inclinometer 516 can transmit a signal corresponding to the grade to the input side 502 of the control system 500. Once received, the TCM 104 can request the transmission oil level to be measured. In block 404, the oil level sensor 212 measures the transmission oil level and sends a signal to the control system 500 corresponding to the measured oil level. The TCM 104 can interpret the measured oil level signal in block 406 into an oil level measurement. For example, a 2 volt signal may be interpreted as 100 mm of oil level.

In an exemplary embodiment, the oil level is interpreted in terms of millimeters from the bottom of the pan. Thus, 100 mm oil level would indicate that the pan is holding a volume of oil that is 100 mm from the bottom of the pan. Since the dimensions of the pan are known, the TCM can compute from the oil level measurement how much oil is in the transmission (notwithstanding that an unknown volume of oil may be "captured" in various housings, clutches, or a torque converter). In other embodiments, the oil level can be measured from other datum points (e.g., interface between pan and housing).

Once the oil level is measured in block 404 and computed into a dimension in block 406, the TCM 104 can determine the desired oil level threshold or band for the measured grade. The desired oil level threshold or band can be downloaded through a software or calibration program to the TCM. For illustration purposes only, a non-limiting example of a desired oil level threshold or band relative to grade is shown in Table 1 below.

TABLE 1

Grade vs. Desired Oil Level

| GRADE | DESIRED OIL LEVEL |
|---|---|
| >(−10°) | 20-50 mm |
| (−5°)-(−10°) | 50-70 mm |
| (−1°)-(−4.9°) | 70-90 mm |
| (−0.9°)-0.9° | 90-110 mm |
| 1.0°-4.9° | 110-130 mm |

TABLE 1-continued

Grade vs. Desired Oil Level

| GRADE | DESIRED OIL LEVEL |
|---|---|
| 5°-10° | 130-150 mm |
| >10° | 150-170 mm |

In Table 1, the negative grade can refer to a downhill grade and the positive grade can refer to an uphill grade. These values are exemplary and are not intended to be limiting. Further, the values of the desired oil level may depend on the location of where the TCM 104 is mounted to the transmission or vehicle. If mounted towards the front of the vehicle, the desired oil level will likely be different than if the TCM is mounted near the rear of the vehicle. Again, these desired levels can be downloaded to the TCM 104 based on the different mounting locations. Since the inclinometer 516 can be disposed internal of the TCM 104, it can be programmed to operate regardless of where the TCM 104 is mounted. The TCM 104, however, is programmed such that the oil level in the transmission may be accurately determined regardless of where the TCM (and thus the inclinometer 516) is mounted.

Once the grade is measured in block 402 and the oil level computation is completed in block 406, the TCM 104 can compare the measured oil level to the desired oil level threshold or band in block 410 using a table similar to the one in Table 1. The result of the comparison in block 410 can then be displayed to a vehicle operator, for example, in block 412 via a vehicle dashboard, shift selector, or other means. The display can be a visual display, an audible display (e.g., an alarm if the oil level is too low), or a combination thereof.

The communication from the TCM 104 to the display can indicate to a vehicle operator that the oil level is either satisfactory for vehicle operation or a different oil level is required. For instance, the TCM 104 can indicate the oil level is one quart or more low of oil. Alternatively, the TCM 104 can also indicate that the oil level is too high and one quart or more of oil needs to be removed. In addition, if the measured oil temperature in block 304 exceeds the oil temperature threshold, and thus the condition in block 310 is not satisfied, the TCM 104 can send a signal to the display that the oil temperature is either too low or too high to produce an accurate oil level measurement. Other messages can be transmitted by the TCM 104 to the display for communicating with the vehicle operator (e.g., input or output speed is too low or too high).

If the oil level is unsatisfactory, the TCM 104 can communicate such a message to the vehicle operator. Once the vehicle operator adjusts the oil level by adding or removing fluid, the TCM 104 can continuously perform the oil level sensing method and communicate accurate oil level measurements to the operator. However, if any of the conditions set forth in the first part 300 of the method become untrue or not satisfied, the TCM 104 can communicate such a message to the operator. In other words, the TCM 104 can continuously and accurately measure the oil level of the transmission regardless of the grade upon which the vehicle is positioned and communicate this level to the operator.

While exemplary embodiments incorporating the principles of the present invention have been disclosed hereinabove, the present invention is not limited to the disclosed embodiments. Instead, this application is intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A method of determining if a fluid level in a transmission satisfies a fluid threshold level, the transmission including a controller and being coupled to a powered vehicle, comprising:
    providing an inclinometer disposed in the controller and a fluid sensor disposed internally within the transmission;
    executing an enabling algorithm, enabling algorithm comprising:
        performing a first set of measurements, the first set of measurements including measuring transmission output speed, measuring fluid temperature, and measuring input speed; and
        comparing the measured transmission output speed to a first threshold, the measured fluid temperature to a second threshold, and the measured input speed to a third threshold;
    enabling a performance algorithm based on a result of each comparison executed in the enabling algorithm;
    executing a performance algorithm, the performance algorithm comprising:
        performing a second set of measurements, the second set of measurements including measuring a grade of a surface upon which the vehicle is positioned with the inclinometer;
        measuring the fluid level in the transmission with the fluid sensor;
        communicating the measured grade and measured fluid level to the controller;
        determining a fluid level threshold based on the measured grade;
        comparing the measured fluid level with the fluid level threshold; and
        determining if the measured fluid level is satisfactory based on the comparison; and
    performing the executing a performance algorithm so long as the measured transmission output speed is less than the first threshold, the measured fluid temperature satisfies the second threshold, and the measured input speed satisfies the third threshold.

2. The method of claim 1, further comprising receiving an oil level signal corresponding to the measured oil level.

3. The method of claim 2, further comprising converting the oil level signal into an oil level dimension.

4. The method of claim 1, further comprising displaying a message related to the comparison.

5. The method of claim 4, wherein the displayed message indicates that the measured fluid level is satisfactory or unsatisfactory.

6. The method of claim 4, wherein the displayed message indicates that a certain amount of fluid needs to be added to the transmission.

7. A method of providing a transmission of a powered vehicle with a desired amount of fluid positioned at any surface grade, the transmission including a controller, an input speed sensor, and an output speed sensor, comprising:
    providing an inclinometer disposed internally within the controller;
    performing a set of conditional tests by the controller, the set of conditional tests comprising:
        measuring transmission output speed, measuring fluid temperature, and measuring input speed; and comparing the measured transmission output speed to a first threshold, the measured fluid temperature to a second threshold, and the measured input speed to a third threshold;

enabling an algorithm to detect a fluid level of the transmission based on results of the performing step;

measuring the surface grade upon which the vehicle is positioned with an inclinometer;

measuring the fluid level in the transmission with a fluid sensor;

communicating the measured grade and measured fluid level to the controller;

determining a desired fluid level based on the measured grade;

comparing the measured fluid level with the desired fluid level; and adjusting the fluid level of the transmission to the desired fluid level based on a result of the comparison.

8. The method of claim 7, further comprising determining if the measured fluid level is sufficient or insufficient based on the comparison.

9. The method of claim 7, wherein the performing step is performed before the measuring the surface grade and fluid level steps.

10. The method of claim 7, wherein the measuring steps are performed if the transmission input speed, transmission output speed, and transmission fluid temperature satisfy the respective first, second, and third thresholds.

11. The method of claim 7, further comprising receiving a fluid level signal from the fluid sensor corresponding to the measured fluid level.

12. The method of claim 11, further comprising converting the fluid level signal into a fluid level defined as a distance unit.

13. The method of claim 7, further comprising displaying a message related to the comparison.

14. The method of claim 13, wherein the displayed message indicates whether the measured fluid level is sufficient or insufficient.

15. The method of claim 13, wherein the displayed message comprises an instruction to adjust the fluid level.

16. A fluid measurement system in a transmission of a powered vehicle for setting an accurate fluid level, comprising:

a housing of the transmission for holding a volume of fluid;

a controller configured to control the transmission;

a fluid sensor coupled to the housing and electrically coupled to the controller, where the fluid sensor is adapted to detect the fluid level in a portion of the housing and send a fluid level signal to the controller;

an inclinometer disposed internally within and electrically coupled to the controller, the inclinometer adapted to measure a grade of a surface upon which the vehicle is positioned; and a table of desired fluid levels defined relative to grade and a set of instructions stored in the controller;

wherein, the controller is operable in a first configuration and a second configuration, in the first configuration, the controller is configured to perform a set of conditional tests and receive a detected fluid level and measured grade, the set of conditional tests comprising:

measuring transmission output speed, measuring fluid temperature, and measuring input speed; and comparing the measured transmission output speed to a first threshold, the measured fluid temperature to a second threshold, and the measured input speed to a third threshold; and in the second configuration, the controller is configured to output an instruction based on the detected fluid level and measured grade.

17. The fluid measurement system of claim 16, further comprising a display electrically coupled to the controller, the display configured to display the instruction.

18. The fluid measurement system of claim 16, further comprising a speed sensor electrically coupled to the controller, the speed sensor adapted to measure transmission input speed or output speed.

19. The fluid measurement system of claim 16, further comprising a temperature sensor electrically coupled to the controller, the temperature sensor configured to measure a temperature of fluid in the housing.

* * * * *